United States Patent

Smith

[15] 3,666,172

[45] May 30, 1972

[54] DUPLICATOR CONTROL FOR CARD PUNCH

[72] Inventor: Ralph E. Smith, Park Ridge, Ill.

[73] Assignee: ICM, Inc.

[22] Filed: Apr. 23, 1970

[21] Appl. No.: 31,194

[52] U.S. Cl. ............................................234/19, 234/125

[51] Int. Cl. ....................................................G06k 1/16

[58] Field of Search ..........................234/18, 19, 124, 125

[56] References Cited

UNITED STATES PATENTS 3,273,792 9/1966 Smith....................................234/18

*Primary Examiner*—James M. Meister
*Attorney*—Hofgren, Wegner, Allen, Stellman & McCord

[57] ABSTRACT

An auxiliary duplicator control for a card punch machine which bypasses the program control of the machine for copying all or a selected portion of the information on a card. The copying may be carried out at normal duplicate speed or at a higher speed used in the card punch machine for field definition indexing.

5 Claims, 2 Drawing Figures

INVENTOR
Ralph E. Smith
BY Hofgren, Wagner, Allen, Stellman & McCord
ATTORNEYS

DUPLICATOR CONTROL FOR CARD PUNCH

This invention relates to an auxiliary control device for a card punch machine, the principal function of which is to facilitate the random or incidental duplication of a punched card while the machine is programed for another operation.

A common form of information recording is a punched card. In a set of cards, the location of holes in rows and columns represents information in accordance with a plan. Card punch machines are available in which blank cards are punched in response to actuation of keys on a manual keyboard. Some machines have a program control which establishes a common format for a series of cards. It sometimes happens that a card must be duplicated in whole or in part as, when it is torn or an error is made. This is presently done by manually repeating actuation of the keyboard. Some machines are capable of reading a punched card and automatically duplicating the information, but only with an appropriate program control. It is not practical to change the program control for the purpose of duplicating an occasional or incidental card.

The present invention provides an auxiliary control for the automatic duplication of a card, at a high rate of speed, without changing the program control for the machine.

A typical card punch machine, as an IBM model 026, has a card reader, a card punch and a program control which may be selectively activated. The machine includes an escape mechanism for stepping the reader and punch in synchronism from column to column of a card, the mechanism having a slow speed and a fast speed. A duplicate mechanism connects the card punch with the card reader to operate the punch in accordance with the information on a card in the reader, at the slower speed of the escape mechanism. The faster speed of the escape mechanism may be selected by actuation of a field definition control, which is normally responsive to the program control, to cause the punch mechanism to step from row to row at high speed within selected fields or groups of columns.

One feature of the invention is the provision of a duplicator control which comprises a single pole, single throw space control switch operable to connect a source of operating potential in the card punch machine with the escape mechanism. This provides for rapid shifting of a card to an appropriate column, without the need for single-stepping with the space bar control of the keyboard. The duplicator control also includes a duplicate control means having a first switch which is operable to connect the source of operating potential with the duplicate mechanism of the card punch machine, to reproduce a card in the reader at the first rate of speed. A second switch is operable to connect the source of operating potential with the field definition control. This causes the escape mechanism to operate at the higher speed, effecting duplication of the card at a second, faster, rate of speed.

Another feature of the invention is that the switches of the duplicator control are located in an accessory unit connected to the card punch machine with a four conductor cable. One conductor being connected between the source of operating potential of the machine and a contact of each of the switches. A different conductor connects the other contact of each switch with the appropriate elements of the machine controlled thereby.

Yet another feature, where the card punch machine program control includes a program card reader with a selectively activated program card sensor, is that the second switch of the duplicator control is connected in parallel with the sensor, operation of the second switch connecting the field definition control of the machine with the source of operating potential without regard to activation of the program control.

Further features and advantages of the invention will readily be apparent from the following specification and from the drawings, in which.

The duplicator control is illustrated and described as used with an IBM model 026 card punch machine. It may be connected in a similar manner with other card punch machines having the capability of card duplication and incorporating a two-speed escape mechanism.

Figure 1:
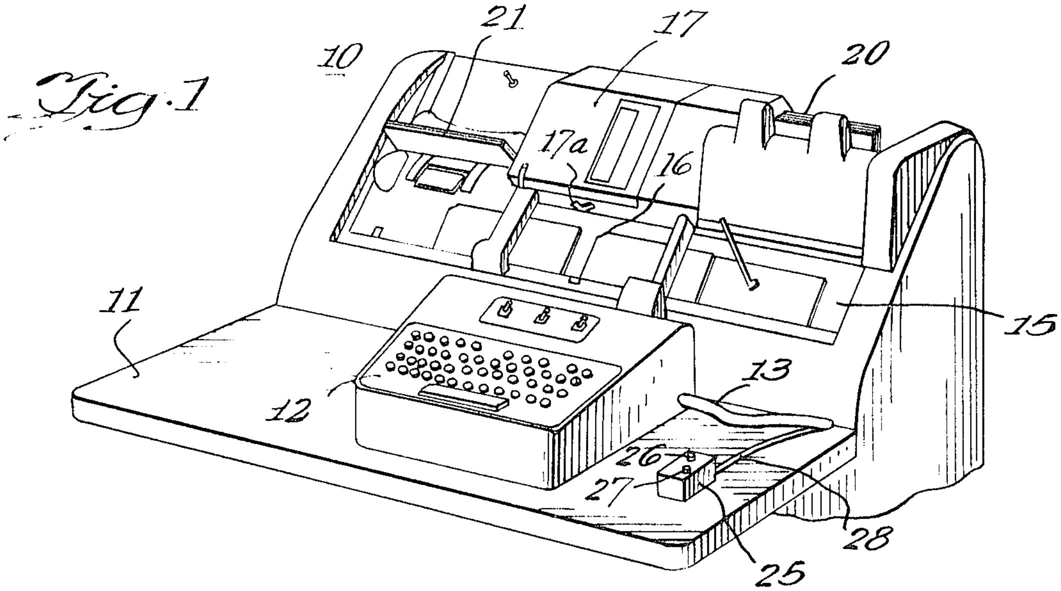
FIG. 1 is a perspective drawing of a card punch with the auxiliary control.

The card punch machine indicated generally as 10 has a work shelf 11 on which a manual keyboard 12 is supported, connected with the appropriate machine elements by a cable 13. The principal elements of the machine accessible to the operator are illustrated in FIG. 1. These include a card reader 15, a card punch 16 and a program control unit 17. Cards are transported one at a time through the machine from a supply 20 to reader 15, punch 16 and to a collector and stacker which reassembles the cards in a deck 21. The transfer of the cards is under the control of the operator through manipulation of keyboard 12. Details of the card transfer mechanism and the keyboard control related thereto are not illustrated in detail herein. They form no portion of the invention and are well known to those skilled in the art.

The program control unit 17 includes a program control element, as a punched card, together with a suitable sensor. Control lever 17*a* may be manipulated by the operator to activate or deactivate the program sensor and thus to determine whether the card punch machine will operate wholly manually or semi-automatically.

In a typical manual operation where blank cards are to be punched with information being recorded, a card is positioned in the punch 16 and the keyboard manipulated to form holes at appropriate row levels of the columns in which the information is to be recorded. Where a series of columns are to be left blank, the card is indexed through the punch one column at a time by actuating the appropriate keyboard element operating an escape mechanism in the machine. If a set of cards is to be punched with information of the same format, it is often desirable to establish a program controlling, for example, the columns in which certain information appears and automatically shifts the card to the appropriate columns, skipping those in which information is not to be recorded. The movement of a card through the punch mechanism with a control program can be accomplished at a higher escape mechanism indexing speed. The use of a control program, however, is practical only when a substantial number of cards of the same format are to be processed at one time, as the machine must be shut down to change the punched program card.

The duplicator control 25 has a pair of operator manipulated momentary contact push button switches 26 and 27 and is connected with the card punch machine 10 through cable 28. Switch 26 provides "space" control and switch 27 a "-duplicate" control.

Figure 2:
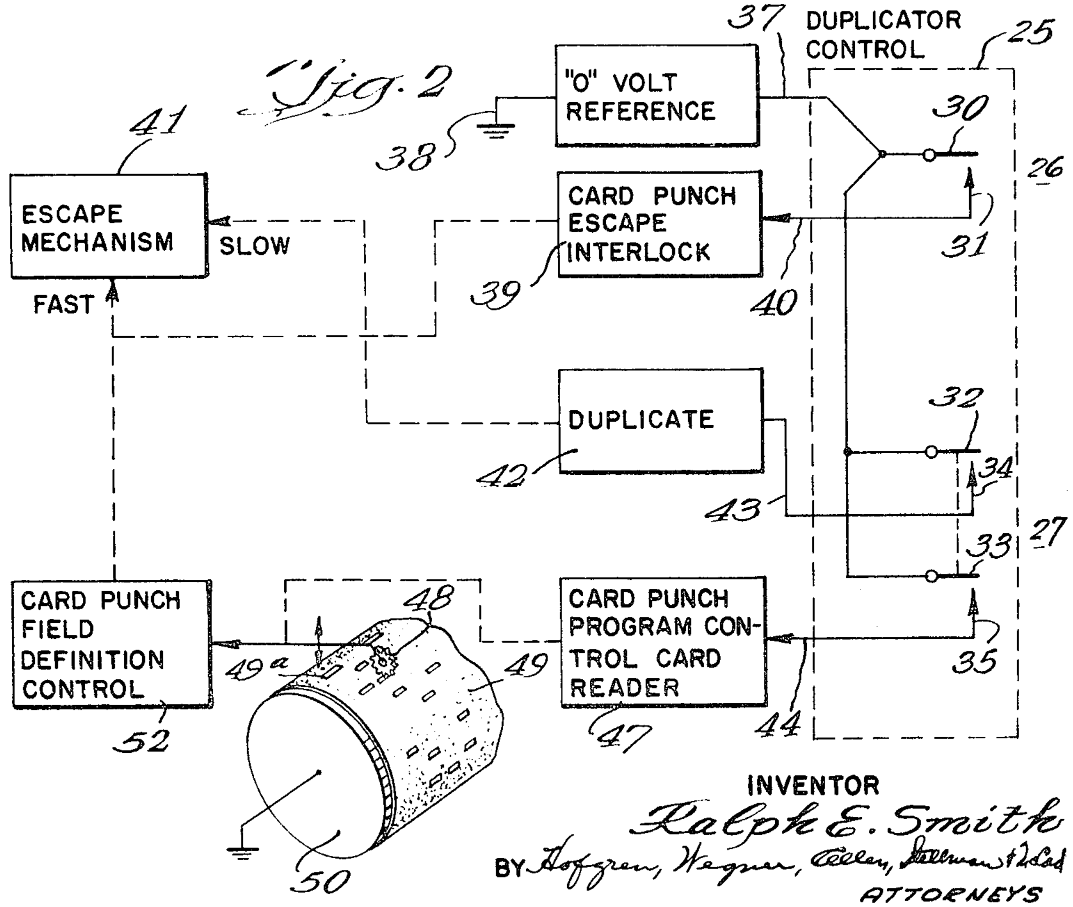
FIG. 2 is a schematic diagram illustrating the duplicator control and its connection with the appropriate elements of the card punch machine.

The nature of switches 26 and 27 and their connections with the card punch machine 10 are illustrated in FIG. 2. Switch 26 is a single pole, single throw switch having a movable contact 30 and a fixed contact 31. Switch 27 is a double pole, single throw switch having movable contacts 32, 33 and associated fixed contacts 34, 35. The mechanical construction of switch 27 is such that upon initial depression of the push button, contact 32 closes. When the switch button is further depressed, contact 33 closes.

The movable contacts 30, 32, 33 are connected together and through conductor 37 of cable 28 with a source of operating potential in card punch machine 10. Here the source of operating potential is shown as a zero volt reference or ground 38.

Fixed contact 31 of switch 26 is connected with the card punch escape interlock 39 of the card punch machine by conductor 40. Through the internal construction of the card punch machine, the card punch escape interlock operates the escape mechanism 41 at a fast speed. The function of switch 26 is to provide repetitive stepping of a card in card punch 16 at the slow rate of the escape mechanism of the order of 18 to 20 columns per second. This permits positioning of a card in the card punch, without need for the operator to operate the space bar of the manual keyboard 12, stepping the card one column at a time.

Contact 32 of duplicate switch 27 actuates the duplicate mechanism 42 of the card punch machine 10, connecting it with the source of operating potential through conductor 43. The duplicate mechanism, through the internal connections of the card punch machine, operates the card punch 16 in accordance with information on a card at reader 15, and is further connected with the escape mechanism 41, operating it at the first or slow speed. Thus, if a card which has been punched has an error or is mutilated so that it must be replaced, it is necessary merely to position it in card reader 15 with a blank card at card punch 16. The program control 17 is deactivated by operation of lever 17a. Switch 27 is depressed completing the circuit through contacts 32, 34 and conductor 43 to the duplicate mechanism 42 of the card punch machine. If the card being copied was mutilated and had no errors, the entire card can be copied. If there was an error to be corrected, switch 27 is released at the appropriate time and the correct information punched in by manipulation of manual keyboard 12. Only those portions of the card which require change need be entered manually, the rest may be done automatically through use of the duplicate control switch 27.

Depression of switch 27 to close contacts 33, 35 has the effect of increasing the speed of the duplicate operation from 9 to 10 columns per second to 18–20 columns per second, the fast speed of operation of the escape mechanism 41 of the card punch machine 10. The card punch machine is capable of this high speed operation when operating with an appropriate program control card in the program control unit 17. As pointed out above, it is impractical to make and utilize a special program card in order to save a few seconds in the duplication of an occasional card with an error or which is mutilated.

The closing of switch 33, 35 connects the source of operating potential through conductor 44 with the card punch program control card reader 47. In the specific embodiment of the invention illustrated, the control card reader includes a star wheel 48 which operates in conjunction with a program control card 49 on a rotating drum 50. Star wheel 48 is moved into and out of contact with the program card 49 by actuation of lever 17a. Star wheel 48 is connected with card punch field definition control 52 which, in turn, operates the escape mechanism at the fast speed. When the control unit 17 is in operation, the star wheel 48 rests on program card 49 and, where an opening 49a occurs therein, contacts grounded conductive drum 50, completing the operating circuit for the card punch field definition control 52. The duplicate control 25 and more particularly switch section 33, 35 of duplicate switch 27 provides the high speed duplicate operation under the control of the operator, rather than requiring a special program card 49.

In a specific card punch machine, the IBM model 026, the various connections of the conductors of cable 28 are made in the following manner. Conductor 37 is connected to a readily accessible point of operating potential, as the upper contact of relay 2B. Conductor 40 is connected with the movable contact of escape interlock relay switch section 46–3. Conductor 43 is connected across the keyboard duplicate key at the movable contact of escape interlock relay switch section 46–2. Conductor 44, providing high speed operation, is connected with program star wheel 12.

I claim:

1. A duplicator control for a card punch machine which has a card reader, a card punch, a program control, means for selectively activating said program control, a source of operating potential, an escape mechanism for said reader and punch, said mechanism having first and second speeds of operation, said second speed being faster than said first speed, a duplicate mechanism connecting said card reader with said card punch to operate the punch in accordance with information on a card in said reader and connected with said escape mechanism to operate it at said first speed, and a card punch field definition control responsive to said program control and connected with said escape mechanism to operate it at said second speed, said duplicator control comprising:

a single pole, single throw space control switch operable to connect said source of operating potential with said escape mechanism to step the reader and punch from column to column of the card, and a duplicate control means including a first switch operable to connect said source of operating potential with said duplicate mechanism actuating said card punch to reproduce a card in said reader and with said escape mechanism to effect reproduction of the card in said reader at said first speed, and a second switch operable to connect said source of operating potential with said field definition control to effect reproduction of the card in said reader at said second speed.

2. The duplicator control of claim 1 wherein the first and second switches are sections of a double pole single throw switch, both sections having a normally open condition and operable to closed condition, said switches closing sequentially to actuate the duplicate control means upon initial operation and then the field definition control upon further operation.

3. The duplicator control of claim 1 in which each of said switches has a contact connected with said source of operating potential.

4. The duplicator control of claim 3 in which said switches are located in an accessory unit separable from said card punch machine and connected thereto with a four conductor cable, one conductor being connected between said source of operating potential in said machine and said contact of each switch, and a different conductor connected independently between the other contact of each switch and the associated escape mechanism, duplicate mechanism and field definition control of the card punch machine.

5. The duplicator control of claim 1 wherein said program control includes a program card reader with a selectively activated program card sensor and said second switch is connected in parallel with said sensor, operation of said second switch connecting said field definition control with said source of operating potential without regard to activation of said program control.

* * * * *